Dec. 27, 1960 H. E. ERIKSON 2,966,103

PHOTOGRAPHIC APPARATUS FOR TREATING PHOTOSENSITIVE MATERIAL

Filed Oct. 21, 1958 2 Sheets-Sheet 1

INVENTOR.
Herman E. Erikson
BY
Brown and Mikulka
ATTORNEYS

Dec. 27, 1960 H. E. ERIKSON 2,966,103

PHOTOGRAPHIC APPARATUS FOR TREATING PHOTOSENSITIVE MATERIAL

Filed Oct. 21, 1958 2 Sheets-Sheet 2

INVENTOR.
Herman E. Erikson
BY
Brown and Mikulka
ATTORNEYS

United States Patent Office 2,966,103

Patented Dec. 27, 1960

2,966,103

PHOTOGRAPHIC APPARATUS FOR TREATING PHOTOSENSITIVE MATERIAL

Herman E. Erikson, Winchester, Mass., assignor to Polaroid Corporation, Cambridge, Mass., a corporation of Delaware Filed Oct. 21, 1958, Ser. No. 768,662

19 Claims. (Cl. 95—13)

This invention relates to photography and more particularly to apparatus for and novel methods of treating photographic sheet materials.

The prior art has included apparatus and methods for both exposing a strip of photosensitive sheet material, either continuously or in a sequence of frames, and processing the exposed strip by superposing it with a second strip, the two strips having a liquid medium distributed between them to effect the processing. As the desired result, for example in the form of a print or diapositive, is a function of the processing time, there is a predetermined minimum period during which the strips must remain in superposed relation. At the end of such period they may then be stripped from one another to recover the desired result.

The dual function of exposure and processing within a unit apparatus, such as a camera, may be accomplished in a plurality of ways. One method requires exposure of the photosensitive strip, superposition of the photosensitive strip with a second strip with processing liquid therebetween, and separation of the strips following a predetermined time interval. Exposure of a plurality of frames requires movement of the photosensitive strip through an exposure position and processing also requires movement of the strip through a superposed relation with the second strip. As the dimensions of the camera usually impose limitations on the linear dimension of a strip movable at a given exposure rate for which a predetermined processing time interval is preferably maintained, there is a functional relationship between the exposure and processing rates in this method.

Another method, similar to the first method, includes the severance of successive portions of the strips following superposition at the start of the processing period. Although the functional relationship of processing time and the rate of photosensitive strip movement may be thus abolished, the method is not readily adapted for use where continuity of film is required, as in motion picture photography.

Accordingly, it is an object of this invention to provide apparatus for and novel methods of successively exposing and thereafter processing a continuous strip of photosensitive sheet material, the frequency and duration of exposure and the processing period of said strip being independent of one another.

Another object of the present invention is to provide novel means for exposing and processing a strip of photosensitive material, said novel means comprising means for moving said photosensitive strip in a first direction to expose said strip, means for moving the exposed strip in an opposite direction into superposition with a second strip, means for introducing a layer of processing composition between said strips, means for maintaining said strips in a substantially superposed relation to one another during a predetermined processing time interval, and means for separating said strips at the expiration of said time interval.

Another object of the present invention is to provide in a photographic device, novel means for exposing a photosensitive strip and processing said strip in cooperation with a second strip, said novel means comprising means for moving said photosensitive strip in a first direction along a predetermined path through an exposure position in said path to expose said strip, said second strip being disposed in approximately parallel relation to said first strip and having an opening therein for defining said exposure position, said photosensitive strip being exposed through said opening, means for moving the exposed strip in an opposite direction into superposition with said second strip, means for introducing a processing composition between said strips when said strips are moved into superposition, means for moving said strips along said path in said opposite direction in a substantially stationary superposed relation to one another for a predetermined processing time interval, and means for separating said strips at the expiration of said time interval.

Other objects of this invention will in part be obvious and will in part appear hereinafter.

The invention accordingly comprises the apparatus possessing the construction, combination of elements and arrangements of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
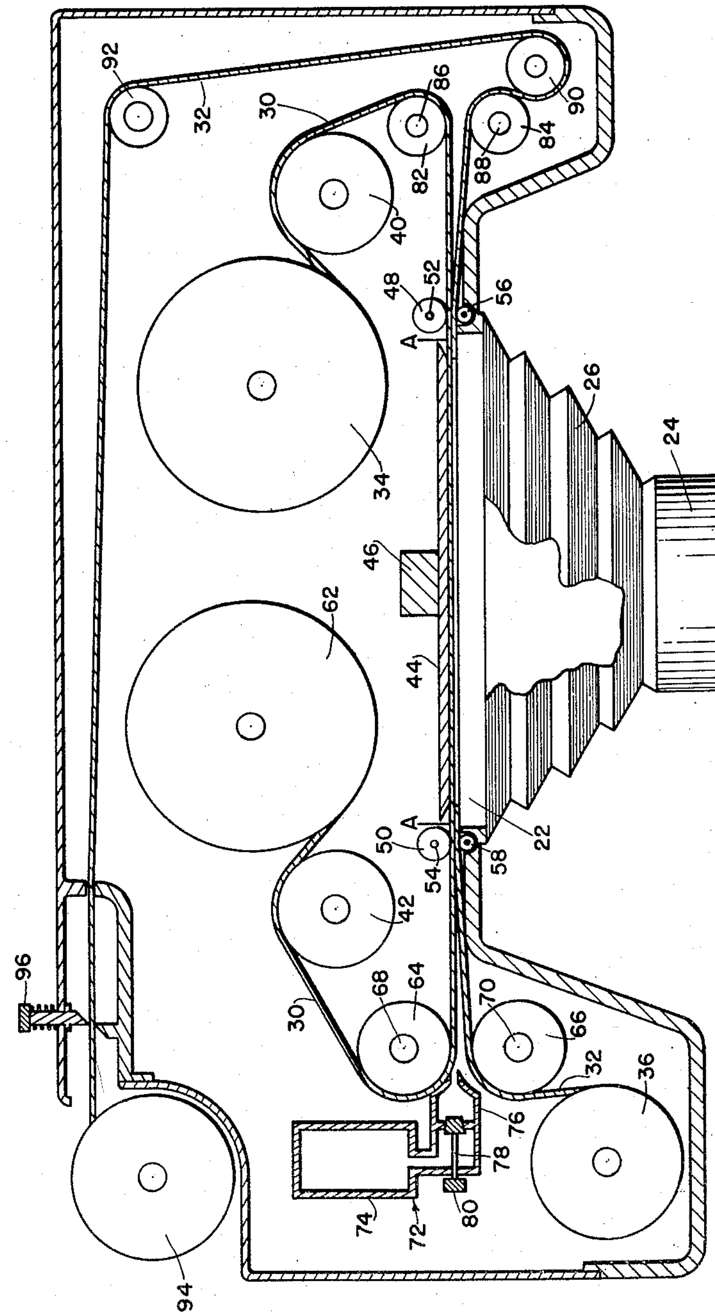
Figure 1 is a schematic sectional view of an embodiment of the invention capable of performing the method thereof with the parts thereof in exposure position.

Photographic apparatus of the type herein disclosed generally includes means for processing an exposed photosensitive strip by superposing said photosensitive strip on another strip and spreading a thin layer of processing composition between said strips. The photosensitive strip includes a layer of photosensitive material, preferably an emulsion of silver halide, in which a latent image may be attained by differential exposure to actinic radiation. The other strip may merely aid in the distribution of the processing liquid, but is preferably adapted to serve as a support for an image-receiving layer in which may be produced a visible print of an image latent in the photosensitive layer. The processing composition, when spread in a uniformly thin layer between the photosensitive strip and other strip, preferably effectuates a silver halide diffusion-transfer reversal process by which the latent image in the photosensitive strip is developed and a positive print is produced in the image-receiving layer of the other strip. The processing composition, for example, may contain an aqueous solution of a silver halide developer such as hydroquinone, a silver halide solvent such as sodium thiosulfate and an alkali such as sodium hydroxide. Means are provided for maintaining the photosensitive and other strip in superposed relation with a layer of processing composition interposed between them to form a sandwich for a predetermined processing period, during which the exposed silver halide of the photosensitive strip is reduced to silver and unreduced silver halide of the photosensitive strip forms a water-soluble complex silver salt which diffuses through the layer of composition to the other strip where, upon being reduced to silver, it forms a visible print. Examples of photographic materials useful in apparatus of the foregoing type are described in detail in Patent No. 2,543,181, issued on February 27, 1951, to Edwin H. Land. It is, of course, to be understood that the apparatus and the processes herein described are not limited to use with any particular species of photosensitive or other strips, the terms, "photosensitive" and "other' being used in their broadest sense to indicate a first strip which is photosensitive and another strip which may merely aid in spreading the processing composition over the surface of the photosensitive strip and which may, if desired, possess other characteristics.

The present invention contemplates a means for exposing an elongated photosensitive strip, either continuously or in an intermittent manner, at a rate or frequency determined by the overall linear speed of movement of the strip along a predetermined path through an exposure position, and includes means for storing the exposed strip for a period of time determined only by the needs or desire of an operator of the invention. Means are provided for disposing an elongated second strip in substantially parallel relation adjacent to the predetermined path, the second strip being maintained in a stationary position relative to said predetermined path during exposure of the photosensitive strip and having a portion through which the photosensitive strip is exposed.

In processing the photosensitive strip, means are provided for leading the entire length of exposed strip from the storage means through means for superposing the exposed strip with the second strip to form a sandwich, the invention including means for treating the sandwich with processing composition, as, for instance, by distributing the composition between the strips at superposition. Means are provided for moving the sandwich along a processing path at a predetermined rate which bears no functional relation to the exposure rate, the superposed strips being in a substantially stationary relation to one another during movement of the sandwich. The processing path preferably comprises said predetermined path, and the direction of movement of the sandwich along the processing path is opposite to the direction of movement of the photosensitive strip during exposure. The invention also comprises means for separating the strips after a minimum processing time interval has elapsed. Where the linear dimension of the processing path is fixed, the processing time interval along said linear dimension is preferably a function of the rate of movement of the sandwich. Means are also provided for separately storing the processed photosensitive strip and the processed second strip following separation.

Referring now to Fig. 1 of the drawings, there is shown one form of a photographic apparatus embodying the present invention and for performing the method thereof. The photographic apparatus is in the form of a camera for exposing and processing strips of photosensitive sheet material in cooperation with second strips. Means, such as a light-tight housing 20, are provided for enclosing and supporting the various elements of the camera in operative relation to one another. One wall of housing 20 is provided with an aperture 22 through which light may be directed and focused by exposure means, such as a conventional lens-and-shutter assembly 24, mounted in covering relation to aperture 22, the means focal plane of the lens of assembly 24 being designated at A—A. As shown in Fig. 1, a suitable means, such as bellows 26, may be provided for connecting housing 20 with assembly 24.

Figure 2:
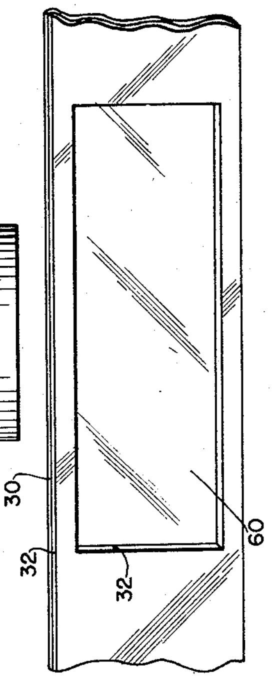
Fig. 2 is a perspective view of a second or receiving strip and a photosensitive strip showing fragments thereof disposed at the exposure plane A—A of Fig. 1.
Figure 3:
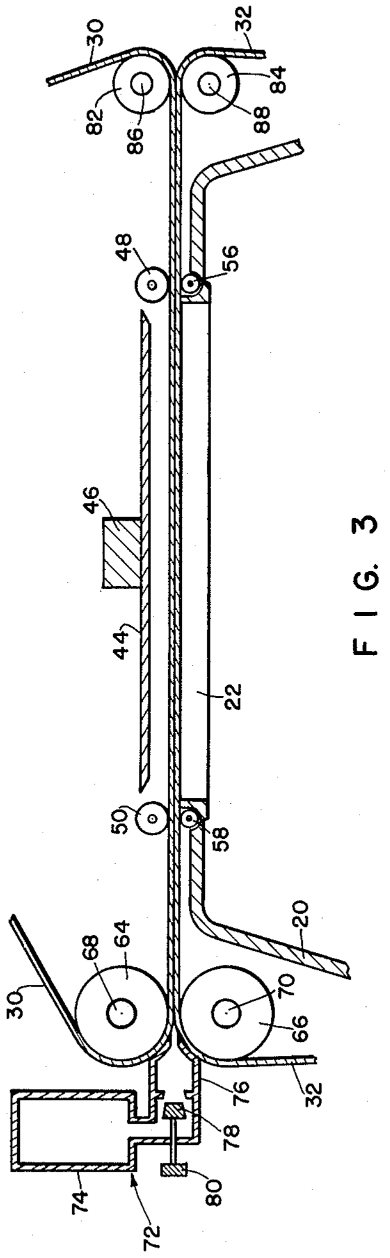
Fig. 3 is a partial schematic sectional view of parts of the embodiment of Fig. 1 in processing position.

The photosensitive strip used in the invention and shown schematically at 30, preferably comprises a suitable base and a suitable photosensitive layer disposed on one surface of the base. The base, for example, comprises baryta or cellulose acetate and the photosensitive layer, for example, may comprise a silver halide emulsion spread upon the base and may be provided with a succession of frames adapted to receive a corresponding succession of latent images upon exposure to actinic light. Second strip 32, a fragment of which is shown in Fig. 2 together with a fragment of strip 30, preferably includes an opaque base and a suitable image-receiving layer disposed on one surface of the second strip to form, for instance, a succession of image-receiving areas. The image-receiving layer preferably comprises one of the compositions well known in the art which adapts the strip to receive prints of latent images formed in strip 30 and developed by processing. As is well known in the art, a succession of containers containing a liquid processing composition may be affixed to second strip 32, at substantially regular intervals so spaced that each container is associated with one image-receiving area. Each container would be of the type provided with a rupturable portion adapted to eject processing composition over the second strip when under compression. However, as a means for distributing processing composition, the embodiment shown in Fig. 1 includes a reagent dispensing means described hereinafter.

A supply of photosensitive strip is preferably disposed within housing 20 in a storage means such as first cassette or spool 34 which is adapted to receive and enclose the supply of strip 30 in a rolled or coiled form. A supply of a second strip 32 is also disposed within housing 20 preferably in a second storage means, which in the form shown comprises a second cassette or spool 36, the supply of strip 32 preferably being in rolled or coiled form. First spool 34 is mounted in housing 20 to one side of aperture 22, and second spool 36 is mounted to an opposite side of the aperture, both spools being so mounted that a strip of material may be unwound respectively from each of said spools and led across aperture 22 in or parallel to the focal plane A—A without twisting or lateral bending of either strip. It should be noted that in the event second strip 32 has associated therewith a succession of containers carrying liquid processing composition, second spool 36 should have a somewhat larger storage capacity than first spool 34 to accommodate the increase in bulk of the second strip.

Means are provided for positioning the photosensitive strip for exposure to actinic light focused by exposure means, such as the lens of assembly 24, upon the mean focal plane A—A. Such a means for positioning the photosensitive strip preferably comprises a means for advancing the photosensitive strip along a predetermined path, means for defining said predetermined path, and means for defining an exposure position in said predetermined path.

As a means for advancing photosensitive strip 30 along plane A—A in a first direction there is provided advancing means, which in the form shown comprises two cooperating driving rolls 40 and 42. Rolls 40 and 42 are pivotally mounted in housing 20, one on each side of aperture 22, and are adapted to advance strip 30 by frictional engagement or preferably by sprockets (not shown) mounted on the periphery of the drum, the sprockets being adapted for releasably engaging a plurality of sequential apertures disposed along the edge or edges of the strip as in conventional motion picture film for instance. Rolls 40 and 42 are preferably linked by means (not shown) well known in the art for selectively and alternatively driving said rolls in accordance with the direction in which it is desired to move the strip either intermittently for the exposure of separate frames or continuously. It should be understood that such a means for advancing photosensitive strip 30 is included herein for illustrative purposes only, other embodiments being also satisfactory, as for instance, a single sprocket or friction roll which is linked to rotatable storage drums having slip-clutches for thereby advancing the photosensitive strip at a predetermined and substantially constant linear rate or frequency. It is of course obvious that where the embodiment includes both roll 40 and roll 42, the associated storage means need not be pivotable but may merely comprise cassettes in which the strip may be stored in a simple coiled form. Another alternative embodiment may be suggested, wherein the storage means are rotatable and comprise the driving means. The latter embodiment would preferably include a means for varying the rate of rotation of the storage means to provide a substantially and predeterminedly constant rate of either intermittent or continuous advancement of the photosensitive strip.

As a means for defining a predetermined path along which the photosensitive strip is moved for exposure, there is provided, for example, a movable guide plate 44 which is preferably characterized in having a substantially planar surface normally positioned in an approximately coplanar relationship with focal plane A—A. The planar surface of plate 44 is adapted to be in slidable engagement with strip 20 during advancement of the strip either continuously or in successive frames during exposure. Guide plate 44 is preferably movable normally to the optic axis of the lens of assembly 24, means shown schematically at 46 being provided for maintaining the guide plate in its normal position at the focal plane and also for moving the guide plate between its normal position and a second position displaced away from and on the optical axis of the lens of assembly 24.

In order to aid in the positioning of strip 30 and for maintaining strip 30 in slidable contact with planar surface of plate 44, means such as first guide roll 48 and second guide roll 50 are mounted respectively adjacent opposite ends of plate 44 and adjacent the periphery of aperture 22 for rotation about pivotal axes 52 and 54 respectively. Mounted upon the periphery of aperture 22 are third guide roll 56 and fourth guide roll 58 which are normally so spaced laterally and respectively from first and second guide rolls 48 and 50 as to allow a sandwich comprising photosensitive strip 30, second strip 32, and a processing composition therebetween to pass snugly but freely without exerting substantial pressure thereon. It should be noted that first and second guide rolls 48 and 50 are preferably so mounted that a portion of each of the cylindrical surface thereof is substantially tangent to plane A—A and may be retained in such tangent relationship by suitable and preferably resilient mounting means.

The exposure position of photosensitive strip 30 in said predetermined path may be defined in terms of an exposure framing means for predetermining the limits of an area of the photosensitive strip subjected to a single exposure. Such an exposure framing means may be provided, for example, by a portion of second strip 32, such as window or opening 60, as shown in Fig. 2, and which is transparent or pervious to radiation actinic to the photosensitive layer of strip 30. The guide rolls comprise a means for so disposing a portion of second strip 32 within the camera, intermediate exposure plane A—A and assembly 24, that during movement of strip 30 in said first direction, opening 60 is positioned in a substantially parallel relation to and adjacent plane A—A for defining an area of the photosensitive strip that may be exposed through opening 60. In order to establish a substantially fixed exposure position, the guide roll also provides means for maintaining second strip 32 in a stationary relation to plane A—A during movement in said first direction for exposure of the photosensitive strip. The dimensions of opening 60 are, of course, determined by the size of the area of strip 30 one wishes to expose and by the size of the image focused at A—A by assembly 24.

The camera includes means such as third cassette or spool 62 for temporarily storing the photosensitive strip after exposure thereof, spool 62 being mounted on housing 20 adjacent second guide roll 50 and being preferably similar in construction and size to first spool 34.

As a means for superposing the photosensitive strip with second strip 32 following exposure of the photosensitive strip and when it is desired to process the photosensitive strip, there is preferably provided a pair of pressure-applying members, which, in the form shown, comprise spread rolls 64 and 66 adapted to be so positioned for processing that as the strips pass between them in face-to-face relation there exists a liquid-receiving space between said strips. This liquid-receiving space may be created by providing a space between the cylindrical peripheries of the two rolls slightly greater than the combined thickness of the two strips. The two rolls are preferably resiliently urged toward one another during processing by means (not shown) such that the liquid-receiving space may not exist in a static condition of the rolls, but may be created by the pressure of the processing liquid passing between the sheets causing separation of the rolls or of the resilient surfaces thereof. It should be noted that spread roll 64 is so disposed that a portion of the cylindrical periphery thereof provides a portion of the path of movement of photosensitive strip 30 between driving roll 42 and guide roll 50, a portion of the cylindrical surface of spread roll 64 being preferably tangent to plane A—A. Roll 64 is preferably mounted for pivotal movement upon housing 20 about pivotal axis 68 which is in a stationary relation to housing 20, while spread roll 66 is mounted for pivotal movement about a pivotal axis 70 which is preferably transversely movable between a first position wherein the cylindrical periphery of roll 66 is closely adjacent or in rotatable engagement with the periphery of roll 64 and a second position wherein roll 66 is displaced from said first position a distance substantially greater than the combined thickness of strips 30 and 32. Means well known in the art may be provided for so displacing roll 66, roll 66 preferably being in said second position during exposure movement of the photosensitive strip in the first direction and preferably being in said first position during processing movement of said strip in the opposite direction. It should be noted that rolls 64 and 66, being preferably resiliently urged toward one another during the advancement in said opposite direction and between said rolls of the two strips, apply pressure to said strips and therefore may cause ejection of processing composition in the event a container is disposed on second strip 32, the composition being thereby spread between the strips to form a sandwich and cause the latent image of strip 30 to be processed and a positive print to be formed in strip 32. It is apparent that in an alternative embodiment, roll 66 may be held stationary while roll 64 is mounted for movement toward and away from roll 66.

However, in the form shown, means for providing fluid processing composition comprises a reagent-dispensing apparatus, indicated generally at 72, which includes a reservoir portion 74 for holding a supply of processing composition and a nozzle portion 76 disposed closely adjacent the bight of rolls 64 and 66 when roll 66 is in its first position. Feed means are also provided for effecting the ejection of the processing composition between the strips from nozzle 76, the feed means preferably comprising a pressure-applying means (not shown), coacting with reservoir 74 so as to force the composition or reagent therefrom preferably in a continuous manner, and a valve 78 movable between an open and closed position for controlling the flow of reagent from the reservoir portion and through nozzle 76. Means, shown schematically at 80, are provided for controlling the operating movements of valve 78. It should be apparent that in some circumstances it may be desirable to provide a simple gravity-operated reagent-dispensing means rather than include a pressure-applying means. An example of a suitable dispensing means readily employed with the present invention may be seen in U.S. Patent No. 2,520,641, issued August 29, 1950, to Edwin H. Land.

Means are provided for separating the processed photosensitive strip 30 from the second strip 32 at a predetermined point, this latter means comprising, in the form shown, a pair of separating rolls 82 and 84 between which the superposed sheets are advanced. As the desired photographic result is a function of the processing time, there is a predetermined period during which the strips must remain in superposed relation, the period being determined in the present invention by the rate of movement of the sandwich between the predetermined position of the spread roll 64 and of the separating roll 82. It is apparent that the use of photographic materials requiring a relatively long processing time would require that the strips either be advanced at a comparatively slow linear speed or that the distance between the superposing means and the separating means be of substantial magnitude. However, as the linear speed of advancement of the superposed strips bears no functional relation to the linear rate or frequency of exposure, it is preferred that the processing time be adjusted in accordance with changes in the linear rate of advancement of the superposed strips rather than by altering the dimensions of the device.

In the form shown, separating roll 82 is mounted for pivotal movement about pivotal axis 86 which is in a substantially stationary relation to housing 20, and separating roll 84 is preferably mounted about pivotal axis 88 which is movable transversely between a first position wherein said rolls are substantially adjacent one another and a second position wherein separating roll 84 is displaced from said first position. Separating roll 82 is preferably so mounted on housing 20 that a portion of the cylindrical periphery thereof is tangent to plane A—A. Separating roll 84 is preferably in the second position during exposure movement of photosensitive strip 30 and in the first position during advancement of the superposed strips therebetween. Means (not shown), of course, are provided for transversely moving roll 84 with respect to roll 82. Various means have been recited for moving elements of the invention between predetermined positions during processing and exposing and have either not been shown or have been shown schematically, all being well known in the art. It is apparent that for simpler operation it is desirable to provide a means for coupling these various means for moving to allow actuation by, for instance, a single control. To that end, a linkage may be provided whereby spread roll 66 and separating roll 84 have been moved to their respective second positions, the driving rolls are rotated in a predetermined direction and guide plate 44 has been positioned at its normal position, all during exposure of photosensitive strip 30. It then follows that the same linkage preferably provides a means whereby spread roll 66 and separating roll 84 have been moved to their respective first positions, the driving rolls are rotated in an opposite direction to said predetermined direction, guide plate 44 has been displaced from its normal position, and valve 78 has been moved to an open position to allow reagent to flow, all during processing. It is to be understood, in another embodiment of this invention, that roll 84 may be maintained in a stationary position and roll 82 be mounted for movement to and from roll 84.

In operation, photosensitive strip 30 stored in first spool 34 is preferably attached to a leader which is threaded from the first spool over driving roll 40 and over separating roll 82, thence between first guide roll 48 and second guide roll 56, along guide plate 44 and thence between third guide roll 50 and fourth guide roll 58, over spread roll 64, over driving roll 42 and onto third spool 62. Continuous exposure or exposure of successive frames is effected by rotation of one or both of the driving rolls in a clockwise direction which advances strip 30 across aperture 22 in sliding contact with guide plate 44 in a first direction. Exposure occurs at any desired rate or frequency dependent only upon the rate of advancement of the photosensitive strip. To effect exposure, driving roll 40 may be in free rotation while only roll 42 is driven to provide a strip-advancing force.

Second strip 32 stored in second spool 36 is preferably attached to a leader which is threaded from spool 36 over spread roll 66 while in its second position, thence between second and fourth guide rolls 50 and 58, along guide plate 44 between photosensitive strip 30 and shutter-and-lens assembly 24, thence between first and third guide rolls 48 and 56, over separating roll 84 while in its second position, and thence across a series of guide means such as idler rolls 90 and 92 to a position wherein it may be withdrawn or advanced from the camera onto a fourth storage means 94 or into the hands of an operator. During advancement of photosensitive strip in said first direction across guide plate 44 for exposure, second strip 32 is maintained in an undriven or stationary position with respect to the guide plate, opening 60 in second strip 32 being positioned across guide plate 44 for providing a means for defining an exposure frame through which photosensitive strip 30 is exposed. Among the advantages accruing from the exposure of strip 30 through a portion of strip 32 is the prepositioning of strip 32 for superposition with the exposed strip 30. Additionally, because substantially the same path is used for both exposing and processing of the strips, the device needed to perform such functions is simplified.

Upon completion of exposure of a portion or all of the photosensitive strip, the exposed strip will then be found stored in third storage spool 62. To effect processing at the discretion of the operator, the strip is threaded back or reversed, and preferably advanced in a direction opposite to said first direction through the same path used to effectuate exposure. Strip 30 is superposed with second strip 32 as hereinbefore described at spread rolls 64 and 66 and reagent or composition from reservoir 74 is fed through nozzle 76 and between the superposed strips at the spread rolls. Spread roll 66 is moved transversely into its first position preferably at the same time as driving rolls 40 and 42 are reversed in rotational direction, the advancing force now being provided by driving roll 40 while driving roll 42 is preferably free moving.

The sandwich formed by the superposition of strip 30 and strip 32 with processing composition spread therebetween, by the pressure applied by spread rolls 64 and 66, is moved as a unit substantially parallel to guide plate 44 to the separating rolls 82 and 84, guide plate 44 being in displaced position and separating roll 84 being in its first position. The motive force for moving the sandwich is provided by the advancement of the photosensitive strip, and the superposition of the strips at the spread rolls causes second strip 32 to be moved out of second storage spool 36. It is apparent that during the processing movement of the sandwich across aperture 22, lens-and-shutter assembly 24 should admit no light which might interfere with the processing. To this end, means may be provided for rendering assembly 24 inoperative during processing movement, such means comprising, for instance, an interlock (not shown) connecting the shutter-and-lens assembly 24 to the spread and separating roll linkage, or a cover or baffle plate which may be inserted in parallel relation with the focal plane and on the shutter-and-lens assembly side of guide plate 44 such that the advancing sandwich is positioned between the guide plate and the baffle plate. As the processing is completed in successive portions of the superposed strips, the processed strips are advanced to the separating rolls at which the processed or developed photosensitive strip may be led over the separating roll 82, driving roll 40, and back into the first storage spool 34. The second strip which may comprise a finished print or diapositive is led over separating roll 84 to the plurality of idler rolls 90 and 92 disposed about the internal periphery of the camera and thence to fourth storage means 94 preferably located exteriorly of housing 20 for ready access by an operator thereof. Cutter means may be provided adjacent the location of the fourth storage means 94 for severing a predetermined portion of the developed second strip, the latter means, for instance, comprising a simple shearing device, shown schematically at 96, mounted on housing 20 and operable by manual or mechanical pressure. It should be noted that means may be provided for maintaining a predetermined amount of tension on the processed second strip from the separating roll 84 across the idler rolls to the fourth storage means 94. Such means would aid in separating the superposed strips, prevent the formation of loops, prevent slackness and consequent damage to the finished print, and may, for instance, comprise a simple manual winding mechanism which is preferably coupled with the linkage mechanism controlling the operation of means for moving the various other elements. While superposing means and separating means have been described as comprising pairs of rolls, it is to be understood that there may be provided other superposing surfaces such as non-rotatable arcuate plates or rods. In the invention it is also to be understood that portions of the apparatus may be suitably hinged or pivoted to allow access for loading strips into storage means and that suitable light seals are desirably employed where necessary to prevent fogging or inadvertent exposure of the photosensitive strip.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic apparatus for exposing a strip of photosensitive material and processing the exposed strip, said apparatus comprising, in combination, means for exposing said photosensitive strip, means for advancing said photosensitive strip in a first direction through an exposure position wherein said strip is exposed, means for providing a supply of a second strip, said second strip having a portion therein transparent to radiation actinic to said photosensitive strip, means for so positioning said second strip between said photosensitive strip and said exposure means that said photosensitive strip is exposed through said radiation-transparent portion during advancement of said photosensitive strip in said first direction, means for superposing said exposed photosensitive strip with said second strip, and means for moving the superposed strips in an opposite direction with a fluid processing composition cooperating with said strips to effect processing of said strips.

2. A photographic apparatus for exposing a strip of photosensitive material and processing the exposed strip in superposition with a second strip of material by a layer of fluid processing composition between said strips, said apparatus comprising, in combination, means for storing a supply of said photosensitive strip, means for exposing said photosensitive strip, means for advancing said photosensitive strip from said storage means in a first direction through an exposure position wherein said strip is exposed, means for providing a supply of said second strip, said second strip having a portion therein transparent to radiation actinic to said photosensitive strip, means for so positioning said second strip between said photosensitive strip and said exposure means that said photosensitive strip is exposed through said radiation-transparent portion during advancement of said photosensitive strip in said first direction, and means for superposing and moving said exposed photosensitive strip with said second strip in an opposite direction with a fluid processing composition cooperating with said strips to effect processing of said strips.

3. A photographic apparatus for exposing a strip of photosensitive material and processing the exposed strip in superposition with a second strip of material by a layer of fluid processing composition between said strips, said apparatus comprising, in combination, first means for storing a supply of said photosensitive strip, means for exposing said photosensitive strip, means for advancing said photosensitive strip from said first storage means in a first direction through an exposure position wherein said photosensitive strip is exposed, second means for storing a supply of said second strip, said second strip having a portion therein for defining said exposure position, said portion being transparent to radiation actinic to said photosensitive strip, means for so disposing said second strip in a stationary position relative to said exposure means and between said photosensitive strip and said exposure means that said photosensitive strip is exposed through said radiation-transparent portion during advancement of said photosensitive strip in said first direction, and means for superposing and moving said exposed photosensitive strip with said second strip in an opposite direction with a fluid processing composition cooperating with said strips to effect processing of said strips.

4. A photographic apparatus as defined in claim 3 including third means for storing said exposed photosensitive strip, and means providing a path for said exposed photosensitive strip between said third storage means and said exposure position.

5. A photographic apparatus for exposing a strip of photosensitive material and processing the exposed strip in superposition with a second strip of material by a layer of fluid processing composition between said strips, said apparatus comprising, in combination, first means for storing a supply of said photosensitive strip, means for exposing said photosensitive strip, means for defining a predetermined path including an exposure position at which said photosensitive strip may be exposed, means for advancing said photosensitive strip from said first storage means in a first direction along said predetermined path through said exposure position wherein said photosensitive strip is exposed, second means for storing a supply of said second strip, said second strip having a portion therein for defining said exposure position, said portion being transparent to radiation actinic to said photosensitive strip, means for so disposing said second strip between said first strip and said exposure means that said radiation-transparent portion is positioned adjacent and in stationary relation to said predetermined path for exposing said photosensitive strip through said radiation-transparent portion during advancement of said photosensitive strip in said first direction, third means for storing the exposed photosensitive strip, and means for superposing and moving said exposed photosensitive strip and said second strip respectively from said third storage means and said second storage means in an opposite direction along said predetermined path with a layer of fluid processing composition between said strips to effect processing of said strips.

6. A photographic apparatus for exposing a strip of photosensitive material and processing the exposed strip in superposition with a second strip of material by a layer of fluid processing composition between said strips, said apparatus comprising, in combination, first means for storing a supply of said photosensitive strip, means for exposing said photosensitive strip, means for defining a predetermined substantially planar path including an exposure position at which said photosensitive strip may be exposed, means for defining a second path for said photosensitive strip from said first storage means to said means for defining a predetermined path, means for advancing said photosensitive strip from said storage means in a first direction through said second path and along said predetermined path through said exposure position wherein said strip is exposed, second means for storing a supply of said second strip, said second strip having a portion therein transparent to radiation actinic to said photosensitive strip, means for so disposing said second strip between said photosensitive strip and said exposure means that said radiation-transparent portion is positioned adjacent said predetermined path for exposing said photosensitive strip through said radiation-transparent portion during advancement of said photosensitive strip in said first direction, third means for storing the exposed photosensitive strip, means for defining a third path for said photosensitive strip between said third storage means and said predetermined path, means for moving and superposing said exposed photosensitive strip and said second strip in an opposite direction along said predetermined path, said means for superposing including said means for defining said third path, means for distributing a layer of fluid processing composition between said strips as they are superposed to effect processing of said exposed photosensitive strip, and means for separating said superposed strips after a predetermined processing time interval, aid means for separating including said means for defining said second path.

7. A photographic apparatus for exposing a strip of photosensitive material and processing the exposed strip in superposition with a second strip of material by a layer of fluid processing composition between said strips, said apparatus comprising, in combination, first means for storing a supply of said photosensitive strip, exposure means for directing radiation to a plane, means for defining a predetermined path including an exposure position at which said photosensitive strip may be exposed, said predetermined path being in an approximately coplanar relation to said plane, means for advancing said photosensitive strip from said first storage means in a first direction along said predetermined path through said exposure position wherein said photosensitive strip is exposed, second means for storing a supply of said second strip, said second strip having a portion therein for defining said exposure position, said portion being transparent to radiation actinic to said photosensitive strip, means for so disposing said second strip between said first strip and said exposure means that said radiation-transparent portion is positioned adjacent and in stationary relation to said predetermined path for exposing said photosensitive strip through said radiation-transparent portion during advancement of said photosensitive strip in said first direction, third means for storing the exposed photosensitive strip, and means for superposing and moving said exposed photosensitive strip and said second strip respectively from said third storage means and said second storage means in an opposite direction along said predetermined path with a layer of fluid processing composition between said strips to effect processing of said strips.

8. A photographic apparatus for exposing a strip of photosensitive material and processing the exposed strip in superposition with a second strip of material by a layer of fluid processing composition between said strips, said apparatus comprising, in combination, first means for storing a supply of said photosensitive strip, exposure means for directing actinic radiation to a focal plane, means for defining a predetermined path including an exposure position at which said photosensitive strip may be exposed, said predetermined path being approximately coplanar with said focal plane, means for advancing said photosensitive strip from said first storage means in a first direction along said predetermined path through said exposure position wherein said photosensitive strip is exposed, second means for storing a supply of said second strip, said second strip having a portion therein for defining said exposure position, said portion being transparent to said actinic radiation, means for so disposing said second strip between said first strip and said exposure means that said radiation-transparent portion is positioned adjacent and in stationary relation to said predetermined path for exposing said photosensitive strip through said radiation-transparent portion during advancement of said photosensitive strip in said first direction, third means for storing the exposed photosensitive strip, means for moving said exposed photosensitive strip from said third storage means in an opposite direction, means for moving said second strip from said second storage means, means for superposing said strips, and means for moving said superposed strips along said predetermined path in said opposite direction with a layer of fluid processing composition between said strips to effect processing of said strips.

9. A photographic apparatus for exposing a strip of photosensitive material and processing the exposed strip, said apparatus comprising, in combination, means for exposing said photosensitive strip, means for advancing said photosensitive strip in a first direction through an exposure position wherein said strip is exposed, means for providing a supply of a second strip, said second strip having a portion therein transparent to radiation actinic to said photosensitive strip, means for so positioning said second strip between said photosensitive strip and said exposure means that said photosensitive strip is exposed through said radiation-transparent portion during advancement of said photosensitive strip in said first direction, means for moving the exposed photosensitive strip in an opposite direction, means for moving and superposing said second strip with said exposed photosensitive strip during movement of the latter in said opopsite direction, and means for distributing a layer of fluid processing composition between said strips as they are superposed for effecting processing of said strips.

10. A photographic apparatus for exposing a strip of photosensitive material and processing the exposed strip in superposition with a second strip of material by a layer of fluid processing composition between said strips, said apparatus comprising, in combination, means for storing a supply of said photosensitive strip, means for exposing said photosensitive strip, means for advancing said photosensitive strip from said storage means in a first direction through an exposure position wherein said strip is exposed, means for storing a supply of said second strip, said second strip having a window therein, means for so positioning said second strip between said photosensitive strip and said exposure means that said photosensitive strip is exposed through said window during advancement of said photosensitive strip in said first direction, means for moving said exposed photosensitive strip in an opposite direction, means for moving and superposing said second strip with said exposed photosensitive strip during movement of the latter in said opposite direction, means for distributing a fluid processing composition between said strips as they are superposed for effecting processing of said exposed photosensitive strip, means for maintaining said strips in superposed relation for a predetermined processing time interval, and means for separating said superposed strips after said predetermined time interval.

11. A photographic apparatus for exposing a strip of photosensitive material and processing the exposed strip in superposition with a second strip of material by a layer of fluid processing composition between said strips, said apparatus comprising, in combination, means for storing a supply of said photosensitive strip, means for exposing said photosensitive strip, means for advancing said photosensitive strip from said storage means in a first direction through an exposure position wherein said strip is exposed, means for storing a supply of said second strip, said second strip having a window therein, means for so disposing said second strip between said photosensitive strip and said exposure means during advancement of said photosensitive strip that said photosensitive strip is exposed through said window, means for storing the exposed photosensitive strip, means for moving said exposed photosensitive strip in an opposite direction, means for moving and superposing said second strip with said exposed photosensitive strip during movement of the latter in said opposite direction, means for distributing a fluid processing composition between the strips as they are superposed to effect processing of said exposed photosensitive strip, means for maintaining said strips in superposed relation for a predetermined processing time interval, and means for separating said superposed strips after said predetermined time interval.

12. A photographic apparatus for exposing a strip of photosensitive material and processing the exposed strip in superposition with a second strip of material by a layer of fluid processing composition between said strips, said apparatus comprising, in combination, means for storing a supply of said photosensitive strip, means for defining a predetermined path including an exposure position at which said photosensitive strip may be exposed, means for advancing said photosensitive strip from said storage means in a first direction along said predetermined path through said exposure position wherein said photosensitive strip is exposed, means for storing a supply of said second strip, said second strip having a window therein, means for so disposing said second strip between said photosensitive strip and said exposure means that said window is positioned adjacent said exposure position and said photosensitive strip is exposed through said window during advancement of said photosensitive strip in said first direction, means for storing the exposed photosensitive strip, means for moving said exposed photosensitive strip in an opposite direction along said predetermined path from said means for storing said exposed photosensitive strip, means for moving and superposing said second strip with said exposed photosensitive strip during movement of said photosensitive strip in said opposite direction, means for distributing a layer of fluid processing composition between said strips as they are superposed to effect processing of said exposed photosensitive strip, means for maintaining said strips in said superposed relation for a predetermined processing time interval, and means for separating said superposed strips after said predetermined time interval.

13. A photographic apparatus for exposing a strip of photosensitive material and processing the exposed strip in superposition with a second strip of material by a layer of fluid processing composition between said strips, said apparatus comprising, in combination, a first storage means containing a supply of an elongated photosensitive strip, a second storage means containing a supply of an elongated second strip, a shutter and lens assembly for directing light to a focal plane, a substantially planar guide element mounted for movement between a first position wherein said guide element is substantially in said focal plane and a second position wherein said guide element is displaced from said focal plane, means for providing a first path for said photosensitive strip between said focal plane and said first storage means, means for advancing said photosensitive strip along said first path in a first direction across said guide element while said guide element is in said first position, means providing a second path for said second strip between said second storage means and said focal plane, said second strip having a light-transparent portion therein, means for so positioning said second strip along said second path and in a second plane between said photosensitive strip and said shutter and lens assembly that said light-transparent portion is disposed in a stationary position approximately parallel to and adjacent the plane of said guide element during advancement of said photosensitive strip in said first direction thereby exposing said photosensitive strip through said transparent portion, third storage means for containing the exposed photosensitive strip, means for defining a third path for said photosensitive strip between said focal plane and said third storage means, means for superposing said exposed photosensitive strip with said second strip, said superposing means comprising said means providing said second path and said means providing said third path, means for distributing a processing composition between said strips during superposition, means for rendering the last-named means selectively operative and inoperative to distribute said composition, means for moving the superposed strips with said composition therebetween in an opposite direction approximately in said focal plane, and means for separating said superposed strips, the last-named means comprising said means providing said first path.

14. A photographic apparatus as defined in claim 13 wherein said superposing means includes a first pressure-applying member having a first straight surface disposed approximately parallel with said focal plane, and a second pressure-applying member having a second straight surface and being mounted for movement between a first position wherein said second surface is spaced from said first surface, in approximately parallel relationship and at a distance of approximately the combined thickness of said photosensitive strip and said second strip, and a second position wherein said second surface is displaced from said first position approximately normally to said first straight surface.

15. A photographic apparatus as defined in claim 14 including a fourth storage means for containing said second strip after processing and separation of said second strip from said photosensitive strip.

16. A photographic apparatus for exposing a strip of photosensitive material and processing the exposed strip, said apparatus comprising, in combination, means for exposing said photosensitive strip, means for advancing said photosensitive strip in a first direction through an exposure position wherein said strip is exposed, means for providing a supply of a second strip, said second strip having a portion therein transparent to radiation actinic to said photosensitive strip, means for so positioning said second strip between said photosensitive strip and said exposure means that said photosensitive strip is exposed through said radiation-transparent portion during advancement of said photosensitive strip in said first direction, means for storing said exposed photosensitive strip, means for advancing said exposed photosensitive strip from said storage means and for advancing said second strip from said providing means in a second direction opposite to said first direction, means for superposing said two strips as they are advanced in said second direction, said superposing means comprising a first surface and a displaceable second surface between and in engagement with which surfaces and with respect to which surfaces said strips are adapted to move in said second direction in superposed relation with a liquid-receiving space therebetween, said surfaces being so displaced from one another during movement of said photosensitive strip in said first direction as to be out of engagement with said strips, and means for separating said superposed strips from one another, said separating means comprising a third surface and a displaceable fourth surface between and in engagement with which surfaces and with respect to which surfaces said strips are adapted to move in said second direction in superposed relation with a liquid-receiving space therebetween, said fourth surface being so displaced from said third surface during advancement of said photosensitive strip in said first direction as to be out of engagement with said strips.

17. A photographic apparatus as defined in claim 16 including a guide means disposed between said superposing means and said separating means and being movable between a first position, wherein said guide means is in engagement with said photosensitive strip during advancement thereof in said first direction, and a second position, wherein said guide means is out of engagement with said photosensitive strip during movement thereof of said opposite direction.

18. A photographic apparatus for exposing a strip of photosensitive material and processing the exposed strip in superposition with a second strip of material by a layer of fluid processing composition between said strips, said apparatus comprising, in combination, first storage means for storing a supply of said strip of photosensitive material, means for exposing the photosensitive strip, second storage means for storing the exposed photosensitive strip, means for advancing said photosensitive strip from said first storage means in a first direction to said second storage means through an exposure position wherein said means for exposing the photosensitive strip exposes said strip, third storage means for storing a supply of said second strip, means for moving said exposed photosensitive strip from said second storage means in a second direction opposite to said first direction, means for moving said strip from said third storage means, means for superposing said photosensitive strip and said second strip, and means for moving the superposed strips along a predetermined path in said opposite direction with a layer of fluid processing composition between said strips to effect processing thereof.

19. A photographic apparatus for exposing a strip of photosensitive material and processing the exposed strip, said apparatus comprising, in combination, means for exposing the photosensitive strip, first storage means for storing the exposed photosensitive strip, means for advancing said photosensitive strip in a first direction to said first storage means through an exposure position wherein said means for exposing said photosensitive strip exposes said strip, second storage means for providing a supply of a second strip, means for advancing said exposed photosensitive strip from said first storage means and for advancing said second strip from said second storage means in a second direction oppositely to said first direction, means for superposing said exposed photosensitive strip and said second strip as they are advanced in said second direction, said superposing means comprising a first surface and a displaceable second surface between and in engagement with which surfaces and with respect to which surfaces said exposed photosensitive strip and said second strip are adapted to move in said second direction in superposed relation with a liquid-receiving space therebetween, said surfaces being displaced from one another during movement of said photosensitive strip in said first direction so as to be out of engagement with the photosensitive strip and the second strip, and means for separating said superposed strips from one another after a predetermined time interval following superposition, said separating means comprising a third surface and a displaceable fourth surface between and in engagement with which surfaces and with respect to which surfaces the exposed photosensitive strip and the second strip are adapted to move in said second direction in superposed relation with a liquid-receiving space therebetween, said fourth surface being so displaced from said third surface during advancement of said photosensitive strip in said first direction as to be out of engagement with said photosensitive strip and said second strip.

References Cited in the file of this patent

UNITED STATES PATENTS

| | | |
|---|---|---|
| 2,491,719 | Fairbank | Dec. 20, 1949 |
| 2,538,511 | Fairbank | Jan. 16, 1951 |
| 2,789,054 | Land | Apr. 16, 1957 |
| 2,802,735 | Land | Aug. 13, 1957 |